May 12, 1931.  W. L. EDEL  1,804,599

PRESSURE OPERATED CONTROL MECHANISM

Filed May 19, 1927

INVENTOR
Walter L. Edel
BY
Pennie, Davis, Marvin & Edmonds
ATTORNEYS

Patented May 12, 1931

1,804,599

UNITED STATES PATENT OFFICE

WALTER L. EDEL, OF NEW HAVEN, CONNECTICUT, ASSIGNOR, BY MESNE ASSIGNMENTS, TO FRIGIDAIRE CORPORATION, A CORPORATION OF DELAWARE

PRESSURE OPERATED CONTROL MECHANISM

Application filed May 19, 1927. Serial No. 192,775.

This invention relates to pressure operated control mechanism and more particularly to apparatus for controlling a valve, switch or the like which will be actuated upon the attainment of certain maximum or minimum conditions of pressure in the apparatus to which it is connected.

An object of the invention is the provision of control mechanism for various types of apparatus in which a change of pressure conditions within the apparatus is depended upon to start a new cycle of operation and the control mechanism is adapted to function upon the change of pressure conditions to open or close a valve, switch or the like.

A further object is the provision of control mechanism employing means to initially counteract the movement which the increase or decrease in pressure tends to create, and adapted to function at a given time to assist the primary force so that the valve, switch or other member being controlled will be opened or closed with a "snap" action.

Figure 1:
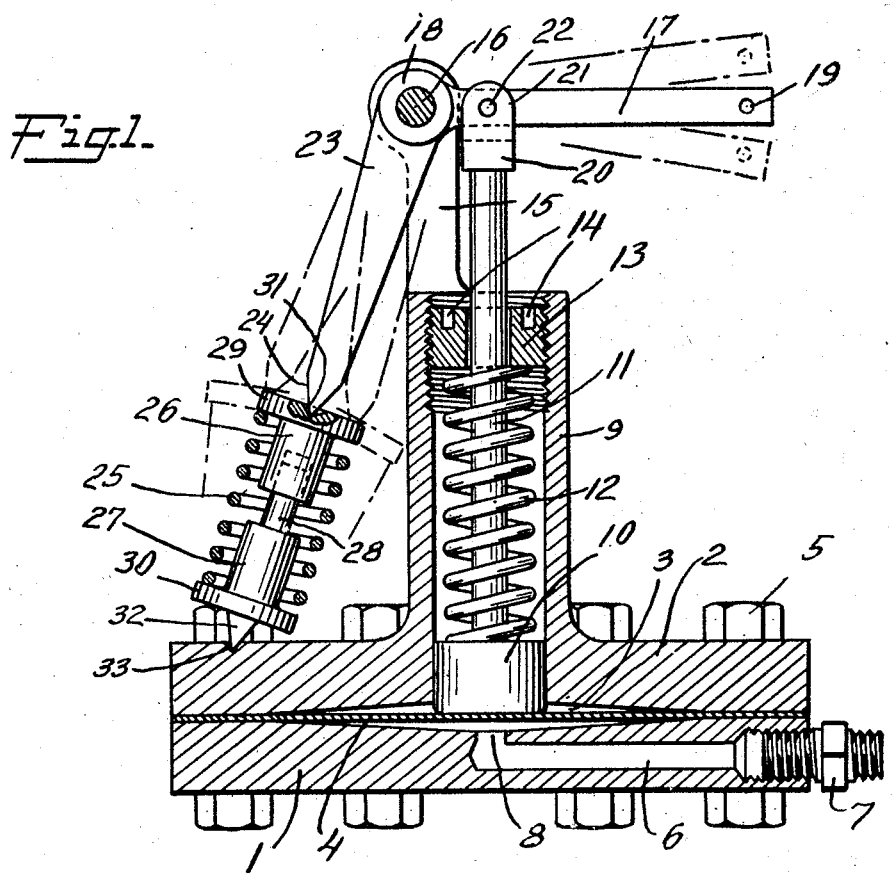
Figure 2:
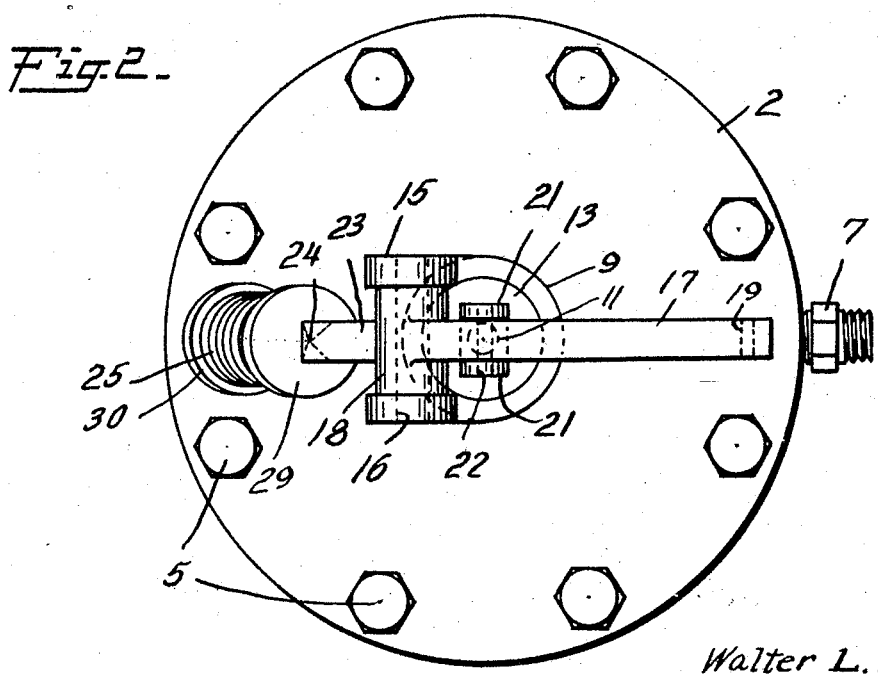

In the drawings, Fig. 1 is a central, vertical, sectional view of one form of the apparatus, and Fig. 2 is a top plan view.

The apparatus consists of a diaphragm casing formed of two plates 1 and 2 which are of any suitable cross-section. The inner faces of the plates are concave or otherwise recessed to form a diaphragm chamber 3. A diaphragm 4 of any suitable material is arranged within this chamber with its perimeter tightly clamped between the plates by means of bolts 5 or other suitable fastening elements. The lower plate is provided with a passage 6 extending from the edge to a point near the center and the outer end of this passage is threaded to receive a nipple 7 or other suitable connecting member by means of which a pipe or hose (not shown) may be connected to the apparatus in which the pressure exists. The inner end of the passage 6 extends upwardly through the upper surface of the lower plate as at 8 so that the pressure on the under surface of the diaphragm will be equal to the pressure in the apparatus to which the control mechanism is connected.

The upper plate is provided with a cylindrical extension 9 having a plunger 10 arranged therein. This plunger is carried by a rod 11 and is adapted to be maintained in contact with the upper surface of the diaphragm by means of a coil spring 12 which surrounds the plunger rod. The lower end of this spring engages the upper face of the plunger. The spring is placed under compression by means of a nut 13 mounted in the upper end of the cylinder and adapted to engage the upper end of the spring. As shown, the upper end of the cylinder is internally threaded throughout an appreciable distance so that the nut can be adjusted to regulate the spring. The nut may be provided with suitable openings 14 in its upper face for the reception of a suitable adjusting tool.

The cylinder carries an arm or bracket 15 in the upper end of which is mounted a pin 16. A control arm 17 is pivotally mounted on this pin, the control arm having a sleeve 18 on its inner end surrounding the pin. The control arm is adapted to be connected in any suitable manner (not shown) with a valve, switch or other member to be actuated upon a change in pressure conditions within the apparatus to which the control mechanism is connected. As shown, the outer end of the arm may be provided with an opening 19 for this purpose. The control arm 17 is connected to the plunger rod 11 by means of a connecting member 20 carried by the plunger rod and having a pair of ears 21 between which the control arm is arranged. A pin 22 passes through aligned openings in the control arm and the ears 21.

The sleeve 18 carries a second arm 23 arranged at an angle to the control arm 17 and preferably provided with a pointed lower end 24. This arm co-operates with a spring pressed toggle to normally counteract the force exerted on the control arm 17 by the diaphragm or spring 12. As shown, a coil spring 25 is mounted between a pair of spring holders 26 and 27. The lower spring holder is provided with an extension 28 of reduced cross-section which is received in a central bore of the upper spring holder to maintain them in alignment. The spring holders are provided with heads 29 and 30 and the head 29 of the upper spring holder is provided with a groove or depression 31 adapted to receive the pointed end 24 of the arm 23. The head of the lower spring holder is provided with a pointed projecting member 32 received in a groove or slot 33 in the upper surface of the plate 2.

In operation, starting with a condition when the pressure is at a minimum, the diaphragm is forced downwardly by spring 12 until it rests on the plate 1. The control arm 17 is then in its lowest position, as indicated in dotted lines, and the spring toggle and arm 23 are in their extreme left position, as indicated in dotted lines. If the pressure is increased, it tends to move the diaphragm 4 upwardly. The moment of force tending to rotate the arm 17 in a counter-clockwise direction is equal to the distance from the center of pin 16 to the center of pin 22 times the difference in force exerted by the pressure on the under side of the diaphragm and the force exerted by the spring 12. At the same time a force is exerted by the spring pressed toggle tending to prevent this counter-lockwise rotation and holding the arm 17 in its lowest position. This moment of force is equal to the force exerted by the spring 25 times the perpendicular distance from the center of the pin 16 to a line drawn from 33 to 31. As the pressure on the underside of the diaphragm rises, a point will be reached in which the moment, tending to rotate the arm 17 in a counter-clockwise direction, will become greater than the moment tending to hold it from rotation, and the arm 17 will start upwardly. As soon as this movement starts, the arm 23 moving toward the right alters the position of the point 31 so that the perpendicular distance between the center of the shaft 16 and the line drawn from the point 33 through the position of 31 decreases very rapidly and the moment of force decreases at the same rate. As this moment of force decreases, the arm 17 will move more rapidly until the line through the points 33 and 31 passes the center line of the arm 23 when the force of the spring 25 will be exerted in the opposite direction to assist in moving the arm 17 to its uppermost position. As a result a "snap" action is obtained and at a certain maximum pressure the arm 17 will move practically instantaneously from its lowest to its highest position. Upon a decrease in pressure the reverse action will take place and the arm 17 will snap back from its highest to its lowest position at a certain minimum pressure. The apparatus can be adjusted to function at different pressures by varying the force of the spring 12 through adjustment of the nut 13.

An apparatus that will actuate at a certain definite maximum or minimum pressure to instantaneously move a control member from one extreme position to another is highly desirable in certain arts and the apparatus herein disclosed is particularly adapted for such use.

I claim:

1. A pressure operated control mechanism comprising a casing, a diaphragm mounted in the casing, means permitting pressure to be exerted on one side of the diaphragm, a spring pressed rod engaging the other side of the diaphragm, a pivotally mounted control arm connected to said rod and adapted to be connected to a member to be operated, a second arm fixed to said control arm and arranged at an angle thereto, a spring operatively associated with the end of the second arm, and a pivoted support for said spring, said control arm moving as a unit with the diaphragm, rod and second arm to produce a "snap" action.

2. A pressure operated control mechanism comprising a casing, a diaphragm mounted in the casing, means permitting pressure to be exerted on one side of the diaphragm, a spring pressed rod engaging the other side of the diaphragm, a pivotally mounted control arm connected to said rod and adapted to be connected to a member to be operated, a second arm fixed to said control arm and arranged at an angle thereto, a spring support pivotally connected to the end of said second arm, a second spring support pivotally mounted on a suitable support, and a coil spring arranged between said spring supports, said control arm moving as a unit with the diaphragm, rod and second arm to produce a "snap" action.

3. A pressure operating control mechanism comprising a casing, a diaphragm mounted in the casing, means permitting pressure to be exerted on one side of the diaphragm, a spring pressed rod engaging the other side of the diaphragm, a pivotally mounted control arm connected to said rod, and adapted to be connected to a member to be operated, a second arm fixed to said control arm and arranged at an angle thereto, and a spring pressed member engaging said second arm to form therewith a toggle, said control arm moving as a unit with the diaphragm, rod and second arm to produce a "snap" action.

In testimony whereof I affix my signature.

WALTER L. EDEL.